Nov. 13, 1956  R. H. BAILES ET AL  2,770,522
METHOD OF PURIFYING AND RECOVERING VANADIUM
FROM PHOSPHATE-CONTAINING SOLUTIONS
Filed June 5, 1952  5 Sheets-Sheet 2

INVENTORS.
RICHARD H. BAILES
ROBERT R. GRINSTEAD
BY
Roland A. Anderson
ATTORNEY.

INVENTORS.
RICHARD H. BAILES
ROBERT R. GRINSTEAD

BY

ATTORNEY.

United States Patent Office 2,770,522
Patented Nov. 13, 1956

2,770,522

METHOD OF PURIFYING AND RECOVERING VANADIUM FROM PHOSPHATE-CONTAINING SOLUTIONS

Richard H. Bailes, Walnut Creek, and Robert R. Grinstead, Concord, Calif., assignors, by mesne assignments, to the United States of America as represented by the United States Atomic Energy Commission Application June 5, 1952, Serial No. 291,946

16 Claims. (Cl. 23—19)

The present invention relates in general to the recovery of vanadium from certain solutions and, more particularly, to the recovery of phosphate-free vanadium from phosphatic solutions thereof.

The process of the present invention is primarily designed for treating certain vanadium-bearing solutions which are produced by operation of the processes described in the two copending applications of Richard H. Bailes and Ray S. Long; Serial Number 159,744, filed May 3, 1950, now U. S. Letters Patent No. 2,756,123, issued July 24, 1956, and Serial No. 165,532, filed June 1, 1950. In such applications there is described the production, by variously modified processes, of aqueous solutions containing vanadium in the vanadyl ($VO^{++}$) oxidation state together with a considerable proportion of phosphate and certain other contaminants.

Vanadium is widely used as an alloying agent in steel manufacture for which purpose phosphate is a highly undesirable contaminant as phosphorus causes brittleness in forging operations and under certain conditions of use. Normally the phosphorus content of the vanadium alloying material can not be tolerated in an amount exceeding 0.1% of the vanadium content and is preferably maintained below this level. Certain other contaminants, such as iron, which may also be present in the said solutions generally are not objectionable.

Conventional vanadium recovery methods are not applicable in this connection as excessive amounts of phosphate appear in the products and for other reasons. Moreover, in order to be feasible as a practical operation an economical large-scale process is required and, as a corollary, provision of an economically feasible large-scale process will make a potentially important source of alloy-grade vanadium available to the national economy.

The present invention provides such an economical large-scale process which makes feasible the practical recovery of an alloy-grade vanadium material. In essence, the process of the invention comprises passing the vanadium-bearing phosphatic solution through a cationic exchange column whereby the vanadium is preferentially adsorbed as a cationic species thereon. Impurities including a major portion of the phosphate are then washed from the column and the vanadium is eluted with certain aqueous acid or salt solutions yielding a vanadyl solution containing only a minor residual proportion of phosphate with other impurities. This solution is then subjected to a further purification treatment including the selective precipitation of almost all of the residual phosphate by the addition of certain materials (titanyl or zirconyl salts) which do not interfere with subsequent vanadium precipitation steps. Optionally, for certain purposes, the purification step may be eliminated through the use of long length columns operated under specified conditions. Finally the vanadium is recovered from the solution by alternative precipitation procedures yielding a hydrous vanadium oxide cake having a phosphate content considerably below minimum commercial tolerance levels.

Accordingly, it is an object of the invention to recover vanadium values from phosphate contaminated solutions thereof in a highly purified form.

A further object of the invention is to recover a purified vanadium product from phosphate contaminated eluate solutions obtained from the anionic exchange treatment of other crude phosphatic solutions.

A still further object of the invention is to provide a method for recovering a purified vanadium product from phosphate contaminated vanadyl solutions obtained from the anionic exchange treatment of crude phosphatic solutions including selective adsorption of the vanadyl values upon a cationic exchange material.

Another object of the invention is to provide a method for recovering a purified vanadium product from phosphate contaminated vanadyl eluates obtained from anionic exchange treatment of crude phosphatic solutions including selective adsorption of the vanadyl values on a cationic exchange material, selective washing removal of impurities from the adsorbed vanadyl values, and elution of the vanadyl values as a considerably purified solution.

Still another object of the invention is to provide a method of recovering a purified vanadium product from phosphate contaminated vanadyl eluates including a primary cationic exchange purification treatment yielding a vanadyl solution with considerably reduced phosphate contamination, a secondary purification including precipitation of residual phosphate from the purified solution with precipitants which do not interfere with a subsequent vanadium precipitation and a final precipitation of a highly purified hydrous vanadium oxide material.

Other objects and advantages of the invention will become apparent together with the foregoing from a consideration of the following description taken in conjunction with the accompanying drawing, of which.

As disclosed in the applications indicated hereinbefore vanadium contained in crude phosphoric acid or other phosphatic solutions may be oxidized to the pentavalent species by anionic exchange materials, particularly anionic state and adsorbed therefrom as a pentavalent anionic exchange resins, together with certain other substances. Thereafter, either before or after removal of various of the other substances, the adsorbed pentavalent anionic vanadium species may be reduced to a tetravalent cationic species and eluted to yield an acidic blue vanadyl eluate containing quantities of phosphate, elutriants and other possible materials which may have been originally adsorbed on the anionic exchange resin. It will be appreciated that solutions derived from other sources and that have a similar composition to such eluates may also be treated by the present process. Also a pentavalent vanadium solution may be subjected to a reduction to produce the requisite tetravalent cationic vanadium species therein.

Figure 1:
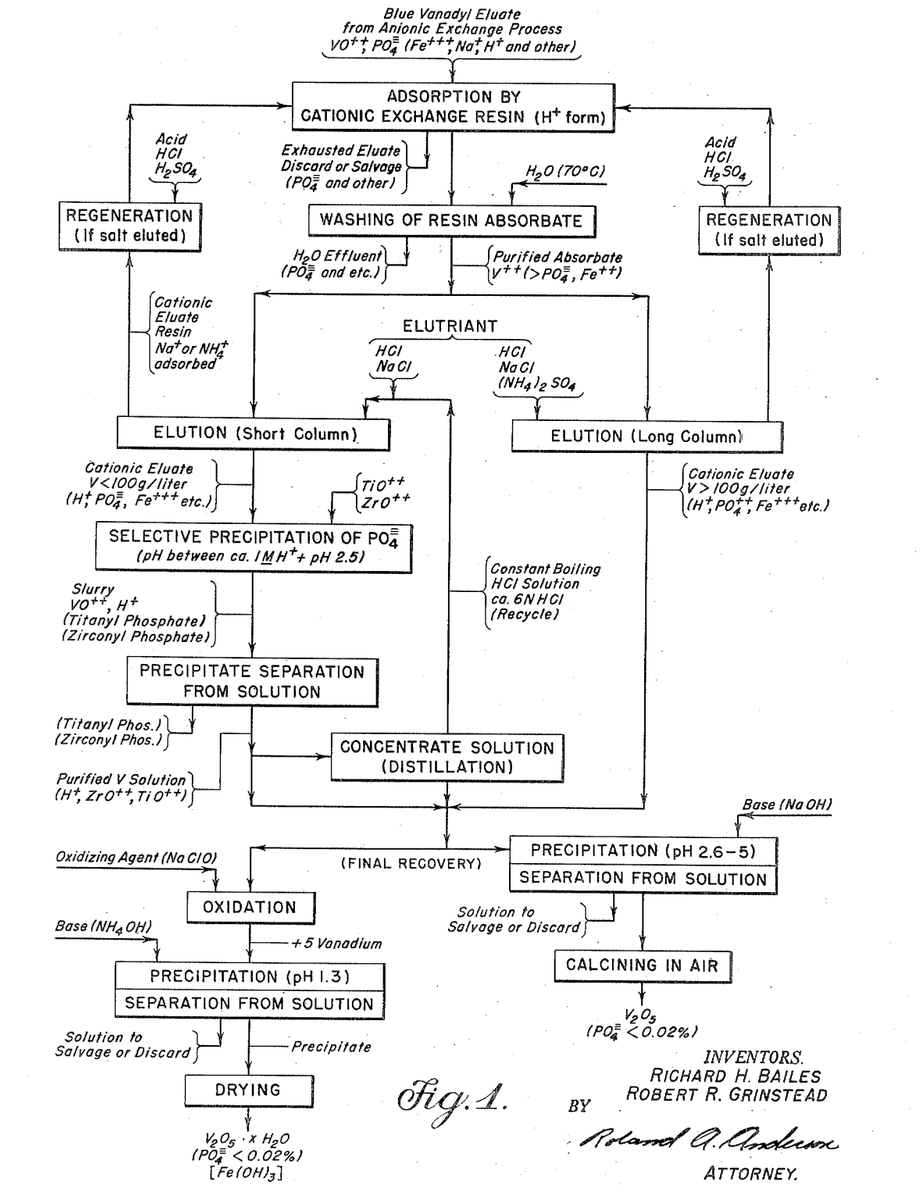
Figure 1 is a flowsheet illustrating the process of the invention.

In accordance with the present invention and with reference to the flow sheet of Fig. 1, of the drawing, the blue eluate or other solution in which the vanadium is contained as a tetravalent cationic vanadium species (vanadyl $VO^{++}$) is passed through the column of suitable cationic exchange resin which has been converted to the hydrogen form wherein the cationic vanadium species is preferentially adsorbed by the resin together with a portion of the phosphate. It has been noted that the efficiency of adsorption is not markedly affected by considerable variations in the concentration of vanadium. This was demonstrated by the fact that the vanadium of dilute eluates produced as described in the said copending applications was adsorbed with about the same efficiency as vanadium from the more concentrated eluates obtained by elution of the anionic exchange columns fully saturated with vanadium.

Cationic exchange resins generally will be found useful for the purposes of the invention provided they possess the degree of insolubility and stability required by the reagents contacted therewith. Strongly acidic exchange resins such as those which comprise an organic resin matrix bearing numerous sulfonic acid substituent groups, which are typified by the commercially-available Dowex 50 cation exchange resin, have been found to operate with a markedly superior efficiency and, accordingly, are preferred. The composition and properties of Dowex 50 cation exchange resin are described in an article, submitted by Dow Chemical Co., in vol. 69, Nov. 1947, pp. 2830–2836, of the Journal of the American Chemical Society. Dowex 50 is stated to be an aromatic hydrocarbon polymer of the type described by D'Alelio in U. S. Patent No. 2,366,007 which was issued on December 26, 1944. Such resin is stated to contain nuclear sulfonic acid groups as the sole ion active group at any pH value. Such resins are preferably employed in the swollen hydrogen form as greater capacity and otherwise optimum performance is achieved thereby.

With respect to the resin column, it has been found that longer columns may be operated to obtain results superior to those of shorter length. Thereby an optional choice of procedures is allowed wherein an intermediate purification with zirconyl or titanyl ions as noted below may sometimes be eliminated. Mesh size of the resin is not critical with coarse and fine mesh resins each offering advantages in different instances.

Following adsorption of the vanadium thereon the column is subjected to a water wash treatment whereby eluate held up by the resin and phosphate and other impurities occluded thereon are at least partially removed from the column. The use of water heated to about 70° C. greatly improves the results of this washing step. With longer columns less water is required for washing the phosphate contamination from the column. More water is required if fast flow rates are employed; however, heating of the water and faster flow rates employed simultaneously greatly reduce washing time. If a slightly higher phosphate contamination is permissible the washing step may, of course, be omitted or modified.

The purified adsorbed vanadium values are then eluted from the cationic exchange column with certain elutriant solutions which are amenable to a further optional purification treatment and from which the vanadium may be recovered. Hydrochloric acid may be employed as the elutriant in which case simultaneous regeneration of the resin column is effected permitting immediate repetition of the previous steps with another portion of vanadyl eluate solution. NaCl or $(NH_4)_2SO_4$ solutions may also be employed; however, with these elutriants, the resin column must be regenerated with acid before reuse. In the event a long column of resin is employed a more concentrated cationic eluate is obtained from which the vanadium can be obtained directly; however, in the event a short column is employed, whereby somewhat more dilute eluates are obtained, a $PO_4^{\equiv}$ removal step, as disclosed hereinafter, is usually required to obtain a high purity product. Rather wire variations in the concentrations of elutriants are operable with concentrated solutions preferred. A 6 N HCl solution is especially preferred as this constant boiling solution is easily recovered by distillation for recycling from residual solutions obtained in subsequent steps enumerated below. As a result of the foregoing adsorption, washing and elution operations there is obtained a cationic eluate in which the phosphate content has been reduced by a value of the order of one thousand fold, i. e., to $\frac{1}{1000}$ of the original eluate with the vanadium content proportionately remaining the same.

As noted above, in the event that a salt solution is employed as the elutriant, the resin must be regenerated with an acid prior to reuse as the vanadium is not adsorbed with high efficiencies by cationic resins other than in the hydrogen form. For this purpose various mineral acids, i. e., HCl, $H_2SO_4$ and others, may be used; however, sulfuric acid is preferred for reasons of cost. Concentrations of the order of 1 N are suitable and require the use of less corrosion resistant equipment. It is not necessary to effect complete regeneration of the resin column as the incoming anionic eluate displaces acid which travels as a fairly concentrated wave ahead of the eluate completing the regeneration.

In order to further reduce the phosphate contamination in the HCl and NaCl eluates certain materials, the phosphates of which are insoluble in the cationic eluate, are added to the eluates, whereby the phosphate is precipitated and such precipitate is filtered from the eluate solution. $ZrOCl_2$ or $TiOCl_2$ are employed for this purpose and are of overriding merit as they do not interfere with subsequent recovery of the vanadium. Sulfate ion interferes with the zirconyl purification step and therefore $(NH_4)_2SO_4$ eluates cannot be treated in this manner and the long column method is employed when $(NH_4)_2SO_4$ is employed as the elutriant.

Optionally, the purified eluate may be concentrated by distillation of 6 N HCl therefrom, which latter is recycled, or the dilute eluate or long column purified eluate is treated for vanadium recovery by alternative methods. In one treatment, a tetravalent hydrous vanadium oxide is precipitated from the said purified eluate by raising the pH of the solution whereupon precipitation begins at about pH 2.6 and is complete at about pH 4–5. The precipitated hydrous vanadium oxide is separated from the solution and then calcined in air to yield substantially pure $V_2O_5$.

In a second method of treatment a strong oxidizing agent such as sodium hypochlorite is added to the eluate whereupon the tetravalent (vanadyl) vanadium is oxidized to the pentavalent state and is precipitated with the addition of a base such as ammonia to obtain a solution pH of about 1.3, as a hydrous pentavalent oxide which may be separated from the solution and dried to yield a vanadium oxide product having a very low phosphorus content. However, if considerable iron is present in the original eluate some may appear in the product which, however, is not objectionable for steel alloying purposes.

Further details of the process of the invention will become apparent from a consideration of the following examples:

EXAMPLE I

Figure 2:
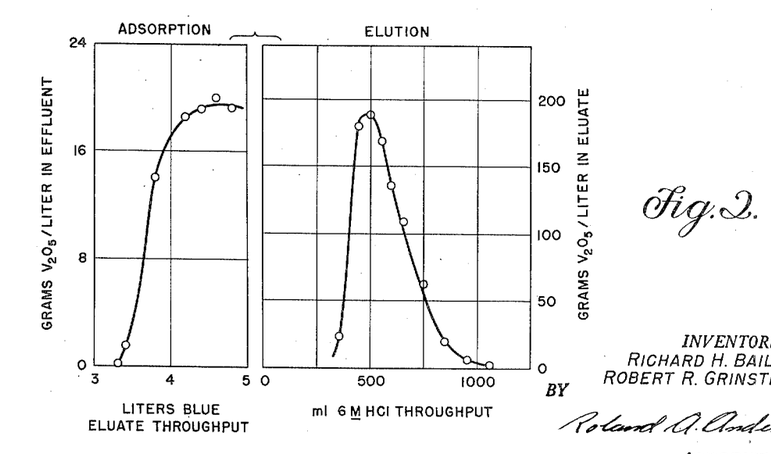
Fig. 2 is a graphical representation of the adsorption of vanadium from a typical anionic exchange eluate and subsequent elution of the vanadium from the resin column.

A blue vanadyl eluate from an anionic exchange process which contained vanadium equivalent to 19.8 g. of $V_2O_5$, 14.4 g. of $PO_4^{\equiv}$ and 0.48 g. Fe per liter was passed through a 1" x 68" column of cationic Dowex 50 exchange resin in the hydrogen form at a flow rate of 80 ml. per minute, and at room temperature to saturate the adsorptive capacity of the resin. The vanadium content in the effluent eluate solution with respect to throughput of solution is illustrated in the adsorptive curve of Fig. 2. A total of vanadium equivalent to 63 g. of $V_2O_5$ was adsorbed by the resin. Elution was then performed with 6 N HCl with the results indicated in the elution curve of Fig. 2 of the drawing.

EXAMPLE II

Two columns containing 50 ml. wet settled volume of coarse mesh Dowex 50 cationic exchange resin in the hydrogen form were saturated with adsorbed vanadyl material by passage therethrough of an anionic exchange eluate containing vanadium equivalent to 26.0 g. of $V_2O_5$, 30 g. of $PO_4^{\equiv}$ and 0.1 g. of Fe per liter. A flow rate of 10 ml. per minute with an eluate temperature of 60° C. was employed during the adsorption.

One of these columns was then washed with water at 60° C. passed through the column at a rate of 5 ml. per minute until the phosphate content of the effluent was reduced to a minimum. The other column was soaked with water for two days at 60° C. and then washed with water at the same temperature and passed through the column at a rate of 10 ml. per minute.

Figure 3:
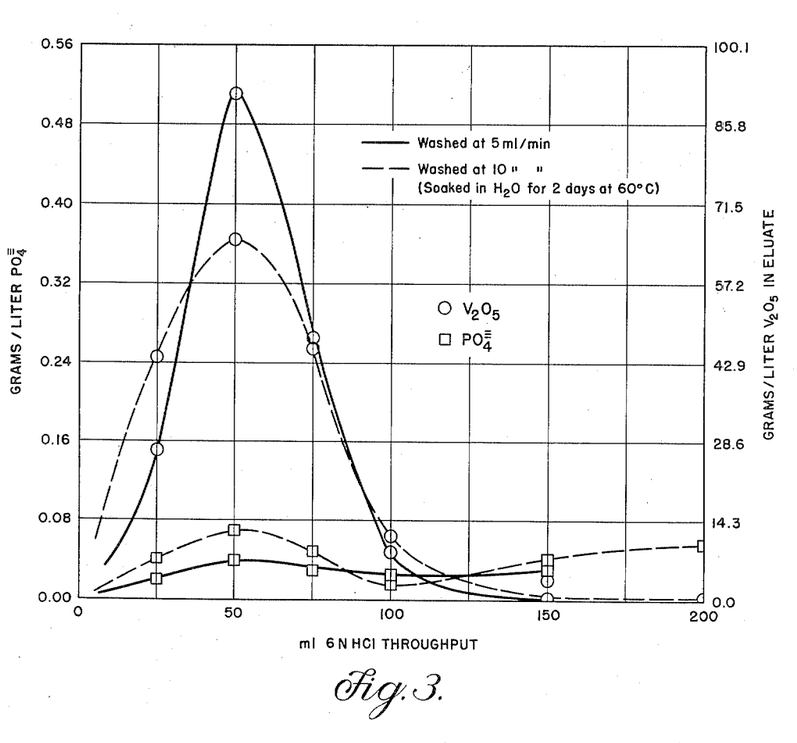
Fig. 3 is a graphical representation of the results with elution performed with hydrochloric acid subsequent to washing adsorbed and occluded impurities from the resin column.

Subsequent elution with 6 N HCl with the results illustrated in Fig. 3 of the drawing, wherein it may be seen that the phosphate contamination had been reduced whereby the ratio of $V_2O_5/PO_4^{\equiv}$ was of the order of 1000:1 in the effluent elutriant.

EXAMPLE III

Figure 4:
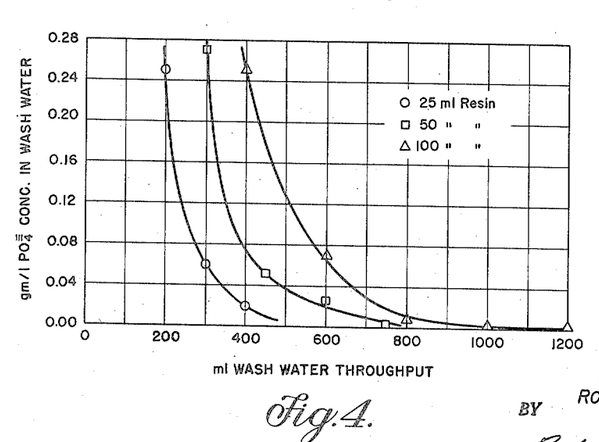
Fig. 4 is a graphical representation of the effect of varying column length upon water washing efficiency.

The effect of column length upon the efficiency of the water washing step was studied by water washing columns having different volumes of resin and a constant cross section at a standard flow rate of 10 ml./min. and at 70° C. with the results illustrated in Fig. 4 of the accompanying drawing. As may be noted doubling the column length does not double the amount of water required to reduce the phosphate concentration of the effluent to a few milligrams per liter. It was noted that if the flow of wash water was interrupted for a short time, there was a small increase in the concentration of phosphate in the effluent indicating that a slower flow rate would reduce the amount of wash water required.

EXAMPLE IV

The effect of varying the mesh size of the resin and also the effect of varying the concentration of hydrochloric acid in the elutriant upon the cationic elution of material adsorbed from blue vanadyl eluates obtained from anionic exchange processes is demonstrated by the results tabulated below.

Table I

Elutions were carried out on 1" diameter columns of cationic exchange resins (Dowex 50) and of 25 ml. volume which had previously been saturated with V from anionic exchange process eluates. Concentrations are in grams/liter.

| Vol. HCl Throughput, ml. | 60–100 mesh cold elution, 5 ml./min. 6 N HCl | | Coarse 70° C., 5 ml./min. 6 N HCl | | Coarse 70° C., 10 ml./min. 6 N HCl | | Coarse 70° C., 5 ml./min. 2 N HCl | | Coarse 70° C., 5 ml./min. 12 N HCl | |
|---|---|---|---|---|---|---|---|---|---|---|
| | V | $PO_4^{\equiv}$ | V | $PO_4^{\equiv}$ | V | $PO_4^{\equiv}$ | V | $PO_4^{\equiv}$ | V | $PO_4^{\equiv}$ |
| 25 | 30.5 | 0.34 | 15.0 | 0.24 | 15.6 | 0.44 | 9.8 | 0.12 | 14.9 | 0.08 |
| 50 | 7.95 | 0.12 | 15.8 | 0.29 | 11.4 | 0.40 | 11.8 | 0.17 | 15.2 | 0.10 |
| 75 | 2.05 | 0.03 | 7.0 | 0.19 | 7.6 | 0.31 | 10.1 | 0.16 | 7.1 | 0.07 |
| 100 | 0.65 | 0.009 | 2.7 | 0.09 | 4.8 | 0.24 | 5.15 | 0.08 | 2.4 | 0.035 |
| 125 | | | 0.75 | | 2.15 | | | | | |
| 150 | | | | | | | 0.92 | | 0.35 | |
| 175 | | | | | 0.55 | | | | | |

As may be seen from Table I, a small phosphate peak concentration is obtained coincident with the vanadium peak which phosphate peak is not completely eliminated with water washing. The fine mesh resin may be seen to yield a peak concentration almost twice that obtained with coarse mesh resin while increasing the flow rate through the latter broadens the chromatographic band somewhat.

It may also be noted that 6 N HCl and 12 N HCl yield almost the same peak V concentration while 2 N HCl is somewhat lower than either. It was thought, judging from the results obtained at the higher concentrations, that the columns were not long enough to allow a reasonable approach to equilibrium; therefore, further experiments with longer columns were performed as noted hereinafter.

1" I. D. columns with various lengths of coarse mesh cationic exchange resins (Dowex 50) which had been previously saturated with V from blue anionic exchange process eluates were eluted with 6 N HCl at a flow rate of 5 ml./min. and at 70° C. with the results noted in Table II.

Table II

| Vol. of HCl used, ml. | 25 ml. resin, V | 50 ml. resin, V | 100 ml. resin | |
|---|---|---|---|---|
| | | | V | Fe |
| 25 | 15.0 | 25.6 | 21.5 | 2.85 |
| 50 | 15.8 | 30.1 | 36.2 | 4.85 |
| 75 | 7.0 | 10.2 | 39.0 | 5.55 |
| 100 | 2.7 | 3.6 | 33.8 | 4.25 |
| 125 | 0.76 | 1.18 | 19.2 | 1.6 |
| 150 | | | 6.3 | 0.65 |
| 175 | | 0.32 | 2.65 | 0.38 |
| 200 | | | | |
| 225 | | | 0.43 | |

As may be seen from Table II, increasing the column length greatly increases the peak vanadium concentrations which are obtained. Accordingly, it may be seen that larger column lengths are advantageous.

EXAMPLE V

Phosphate contamination of cationic HCl eluates obtained in Example IV was lowered by an oxidation-precipitation procedure. Sufficient sodium hypochlorite was added to the eluate solution to oxidize the vanadium to the pentavalent state. Subsequent neutralization with ammonia to pH 1.3 and digestion on a steam bath for two days yielded a product, which when filtered and dried at 110° C., analyzed 68% $V_2O_5$ and 0.02% P. Such a product is sufficiently phosphate free for steel alloying purposes although a few percent of iron may have been present. The remainder of the product was water.

EXAMPLE VI

A synthetic solution similar to the cationic eluate obtained from anionic exchange processes and containing about 100 grams/liter of $V_2O_5$, as $VO^{++}$ ion, and 0.3 gram/liter $PO_4^\equiv$, in 6 N HCl, was prepared by dissolving $V_2O_5$ in 6 N HCl with heating and while $SO_2$ was bubbled therethrough. With slow addition of ammonia to a portion of the solution it was noted that incipient precipitation occurred at about pH 2.6 with complete precipitation at about pH 4–5. Analysis indicated that all of the contaminant phosphate appeared in this precipitate with the vanadium indicating the necessity for prior removal of the phosphate. Therefore, a precipitation procedure employing zirconyl and titanyl ions was developed to remove the phosphate contaminant. It may be noted that zirconyl ion is somewhat superior for this purpose and is preferably employed.

Actual eluates and synthetic solutions of comparable composition were employed in a series of phosphate precipitation experiments with conditions and results as tabulated in the Table A which follows. In general, in these experiments, a given amount of the metallic chloride ($ZrOCl_2$ or $TiOCl_2$) was added to the HCl eluate, the solution neutralized to the desired pH and treatment performed as indicated in the said Table A. As may be noted, with a 200% stoichiometric excess of zirconyl chloride and neutralization to between 1 M $H^+$ and pH 2.0 (A conditions) a very satisfactory lowering of the phosphate contamination is obtained even in 6 M HCl. With heated solutions (B conditions) as may result from neutralization of the highly acidic eluate, a lower pH (below about 2.5) is necessary and a slightly better phosphate removal is obtained.

Table A.—Removal of $PO_4^\equiv$ from 6 N HCl eluates with $ZrO^{++}$ and $TiO^{++}$ ions Ions were added as chloride salts prior to neutralization with $NH_3$. Series 032850GV and 032050GX were done with actual HCl eluates. The others were done with a synthetic eluate.

|  | Actual A | Synthetic | |
|---|---|---|---|
|  |  | B | C |
| Grams/liter $V_2O_5$ (as $VO^{++}$) | 65.5 | 119 | 78 |
| Grams/liter $PO_4^\equiv$ | 0.08 | 0.29 | 0.50 |
| Grams/liter Fe | 2.5 | | |

| Expt. | Vol. of Head taken | mg. Metal Ion Added | Percent of Stoich. | pH of Neutralization | Treatment of Slurry [1] | Filtrate Analysis, g./l. $PO_4^\equiv$ | Ratio of P to $V_2O_5$ (percent) | Percent $V_2O_5$ Lost to Ppt. |
|---|---|---|---|---|---|---|---|---|
| 031050GV1 | 50 ml. B | 15.5 Ti | 400 | 2.0 | A | 0.018 | 0.013 | |
| 031050GV2 | 50 ml. B | 15.5 Ti | 400 | 1.3 | A | 0.012 | 0.01 | |
| 031050GV3 | 50 ml. B | 15.5 Ti | 400 | 1.8 | A | 0.006 | 0.005 | |
| 032850GV7 | 100 ml. A | 2.5 Ti | 120 | 2.0 | A | 0.072 | 0.06 | 0.3 |
| 032850GV8 | 100 ml. A | 4.0 Ti | 200 | 2.0 | A | 0.065 | 0.05 | 0.5 |
| 032850GV9 | 100 ml. A | 8.0 Ti | 300 | 2.0 | A | 0.046 | 0.04 | 1.4 |
| 032850GV10 | 100 ml. A | 2.5 Ti | 120 | 2.0 | B | 0.067 | 0.05 | 4.9 |
| 032850GV11 | 100 ml. A | 4.0 Ti | 200 | 2.0 | B | 0.058 | 0.04 | 1.7 |
| 032850GV12 | 100 ml. A | 8.0 Ti | 300 | 2.0 | B | 0.049 | 0.04 | 4.8 |
| 030950GV1 | 50 ml. B | 14 Zr | 200 | 6 N HCl [2] | C | 0.045 | 0.02 | |
| 030950GV2 | 50 ml. B | 14 Zr | 200 | 1 N HCl [2] | A | 0.009 | 0.005 | |
| 030950GV3 | 50 ml. B | 14 Zr | 200 | 2.0 | A | 0.005 | 0.003 | |
| 031450GV1 | 50 ml. B | 7 Zr | 100 | 6 N HCl [2] | C | 0.093 | 0.037 | 0 |
| 031450GV2 | 50 ml. B | 8.4 Zr | 120 | 6 N HCl [2] | C | 0.053 | 0.02 | 0 |
| 031450GV3 | 50 ml. B | 11.2 Zr | 160 | 6 N HCl [2] | C | 0.048 | 0.018 | 0 |
| 031450GV4 | 50 ml. B | 14 Zr | 200 | 6 N HCl [2] | C | 0.038 | 0.016 | 0 |
| 032050GX1 | 50 ml. C | 5.6 Zr | 47 | 2.0 | A | 0.098 | 0.08 | |
| 032050GX2 | 50 ml. C | 9.8 Zr | 81 | 2.0 | A | 0.03 | 0.025 | |
| 032050GX3 | 50 ml. C | 14 Zr | 117 | 2.0 | A | 0.017 | 0.015 | |
| 032050GX4 | 50 ml. C | 20 Zr | 170 | 2.0 | A | 0.013 | 0.012 | |
| 032850GV1 | 100 ml. A | 5.0 Zr | 125 | 2.0 | A | 0.03 | 0.023 | 0.5 |
| 032850GV2 | 100 ml. A | 8.0 Zr | 200 | 2.0 | A | 0.019 | 0.014 | 0.7 |
| 032850GV3 | 100 ml. A | 12.0 Zr | 300 | 2.0 | A | 0.007 | 0.006 | 0.7 |
| 032850GV4 | 100 ml. A | 5.0 Zr | 125 | 2.0 | B | 0.020 | 0.015 | 1.6 |
| 032850GV5 | 100 ml. A | 8.0 Zr | 200 | 2.0 | B | 0.009 | 0.007 | 5.8 |
| 032850GV6 | 100 ml. A | 12.0 Zr | 300 | 2.0 | B | 0.011 | 0.008 | 2.1 |

[1] A—pH adjusted at 30°–40° C.; solutions stood for 3 hours. B—pH adjusted at 60°–70° C., solutions digested on steam bath one hour; stood for 2 hours. C—pH adjusted at room temperature; solutions stood overnight.
[2] The pH of the final solutions is that which results with this concentration of acid.

Combined phosphate free filtrates from the above were further neutralized to precipitate the vanadium as tetravalent hydrous oxide under the conditions and with the results noted in Table B, which follows: As may be noted therefrom the recovery is substantially the same when the precipitations are performed either at 30° C. or 60° C. From synthetic solutions precipitation did not start at as low a pH as in the actual eluates. The differences may be attributable to the presence of ferric ion in the eluates. However, it may be noted, in all cases, that the precipitation becomes substantially complete as a narrow range of pH values of about 4–5 is attained. Precipitation of vanadium is sluggish in cold solutions and the initial precipitation of ferric hydroxide may hasten the formation of the vanadium precipitate. With cold neutralization, iron continues to precipitate for several days while with hot neutralization most of the iron is precipitated in a few hours.

Table B.—Precipitation of $VO_2$ cake

EFFECT OF TEMPERATURE AND pH

Composition of head solutions was as follows:

|  | Synthetic | Actual eluate |
|---|---|---|
| Grams/liter $V_2O_5$ (present as $VO^{++}$) | 119 | 65.5 |
| Grams/liter $PO_4^\equiv$ | 0.3 | 0.1 |
| Grams/liter Fe | | 2.5 |
| HCl | 4–5 M | 4–5 M |

Precipitations carried out by adding 15 N $NH_4OH$ to solutions until proper pH reached.

SYNTHETIC SOLUTIONS

| Expt. No. | Vol. Sol'n Taken, ml. | pH of Pptn. | Precipitation Conditions | Filtrate Analysis, g. $V_2O_5$/liter | Percent $V_2O_5$ Pptd. |
|---|---|---|---|---|---|
| 031550GV1 | 50 | 3.7 | 35° C.; stood overnight | 28.8 | 47 |
| 031550GV2 | 50 | 3.9 | do | 12.3 | 74 |
| 031550GV3 | 50 | 4.5 | do | 2.25 | 95.6 |
| 031550GV4 | 50 | 5.1 | do | 0.24 | 99.6 |
| 031550GV5 | 50 | 5.9 | do | 0.08 | 99.8 |
| 031550GV6 | 50 | 6.6 | do | <0.08 | 99.9+ |
| 031550GV8 | 50 | 7.6 | do | <0.08 | 99.9+ |

ACTUAL ELUATES

| Expt. No. | Vol. Sol'n Taken, ml. | pH of Pptn. | Precipitation Conditions | Filtrate Analysis, g. $V_2O_5$/liter | Percent $V_2O_5$ Pptd. |
|---|---|---|---|---|---|
| 032850GV1 | 100 | 3.5 | 30° C., stood 2 days | 5.0 | 79.4 |
| 032850GV2 | 100 | 4.1 | do | 0.2 | 99.7 |
| 032850GV3 | 100 | 4.5 | do | 0.12 | 99.4 |
| 032850GV7 | 100 | 5.0 | do | 0.37 | 98.7 |
| 032850GV8 | 100 | 6.0 | do | 0.1 | 99.7 |
| 032850GV9 | 100 | 7.0 | do | 0.15 | 99.5 |
| 032850GV4 | 100 | 3.5 | 60° C. for ½ hr., stood 2 days | 1.75 | 95.0 |
| 032850GV5 | 100 | 4.0 | do | 0.37 | 99.0 |
| 032850GV6 | 100 | 4.5 | do | 0.21 | 99.3 |
| 032850GV10 | 100 | 5.0 | do | 0.19 | 99.3 |
| 032850GV11 | 100 | 6.0 | do | 0.06 | 99.8 |
| 032850GV12 | 100 | 7.0 | do | 0.05 | 99.8 |

Certain of the precipitate products obtained in the above experiments were dried and ignited under the conditions and with the results indicated in Table C which follows. In general, ignition to 400° C. appears to yield substantially the same product quality as fusing at 800° C. The initial precipitate, when dried at about 110° C., is black or greenish black and analyzes about 50–80% $V_2O_5$, dependent upon the amounts of $NH_4Cl$ occluded and water retained. Ignition or fusion produces a cake containing 89–99% $V_2O_5$.

*Table C.—Quality of vanadium product*

Products were obtained from experiments reported in Tables A and B and represent recoveries from eluates obtained from the anionic exchange processes.

| Expt. | Metal Ion used for $PO_4^=$ Removal | Percent of Stoich. Amt. for $PO_4^=$ Present | pH of $VO_2$ Pptn. | Temp. of $VO_2$ Pptn. | Method of Drying $VO_2$ Cake | Product Analysis | | | Total Percent |
|---|---|---|---|---|---|---|---|---|---|
| | | | | | | Percent $V_2O_5$ | Percent $Fe_2O_3$ | Percent P | |
| 32850GV4 | Zr | 125 | 3.5 | 60° C | 24 hrs. at 400° C | 95.6 | 0.3 | 0.012 | 95.9 |
| 32850GV5 | Zr | 200 | 4.0 | do | do | 98.6 | 0.7 | 0.009 | 99.3 |
| 32850GV6 | Zr | 300 | 4.5 | do | do | 94.5 | 0.6 | 0.006 | 95.1 |
| 32850GV10 | Ti | 120 | 5.0 | do | do | 93.6 | 1.2 | 0.04 | 94.8 |
| 32850GV12 | Ti | 300 | 7.0 | do | do | 89.3 | 5.1 | 0.04 | 94.4 |
| 32850GV1 | Zr | 125 | 3.5 | 30° C | 1 hr. at 800° C | 94.0 | 0.2 | 0.04 | 94.2 |
| 32850GV2 | Zr | 200 | 4.1 | do | do | 95.2 | 0.5 | 0.02 | 95.2 |
| 32850GV3 | Zr | 300 | 4.5 | do | do | 97.4 | 1.0 | 0.01 | 98.4 |
| 32850GV7 | Ti | 120 | 5.0 | do | do | 96.9 | 1.7 | 0.05 | 96.9 |
| 32850GV8 | Ti | 200 | 6.0 | do | do | 92.9 | 3.6 | 0.05 | 92.9 |
| 32850GV9 | Ti | 300 | 7.0 | do | do | 93.9 | 4.7 | 0.04 | 98.6 |

EXAMPLE VII

Figure 5:
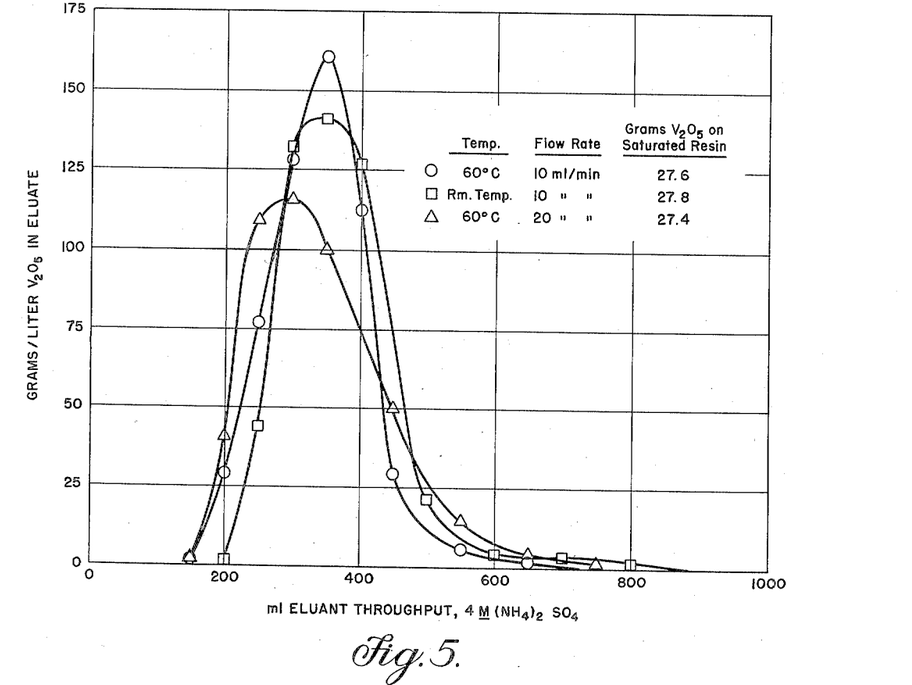
Fig. 5 is a graphical representation of the results obtained with elution of vanadium under various conditions from a 34" cationic exchange column with ammonium sulfate solution.
Figure 6:
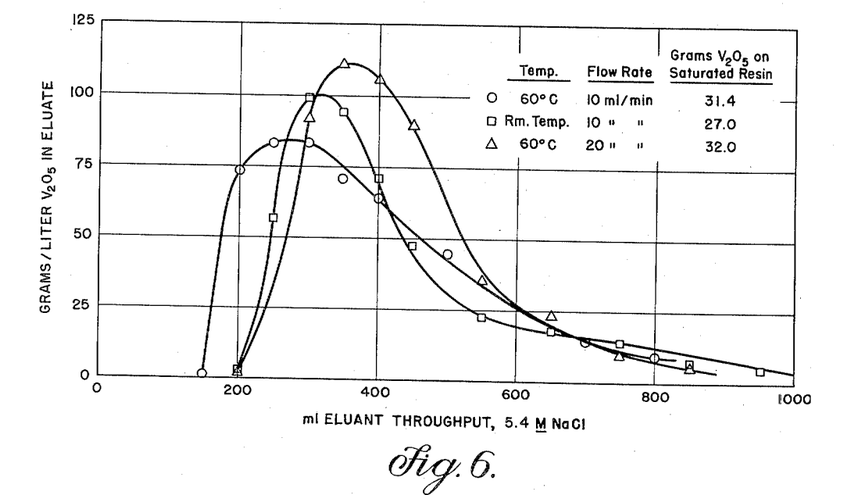
Fig. 6 is a graphical representation of the results obtained with elution of vanadium under various conditions from a cationic exchange column with NaCl solutions.

34″ x 1″ columns of a cationic exchange resin (Dowex 50, hydrogen form) were saturated with V from blue vanadyl anionic exchange eluates, the columns washed with water and the columns eluated with $(NH_4)_2SO_4$ and NaCl solutions with the conditions and results indicated in Figs. 5 and 6 of the accompanying drawing. The salt solutions employed are approximately saturated solutions. Since the ammonium salt is the more soluble in terms of cation molarity, it produces more concentrated vanadium eluates. Temperature and flow rates did not affect the elution curve greatly insofar as amount of eluant required.

EXAMPLE VIII

Figure 7:
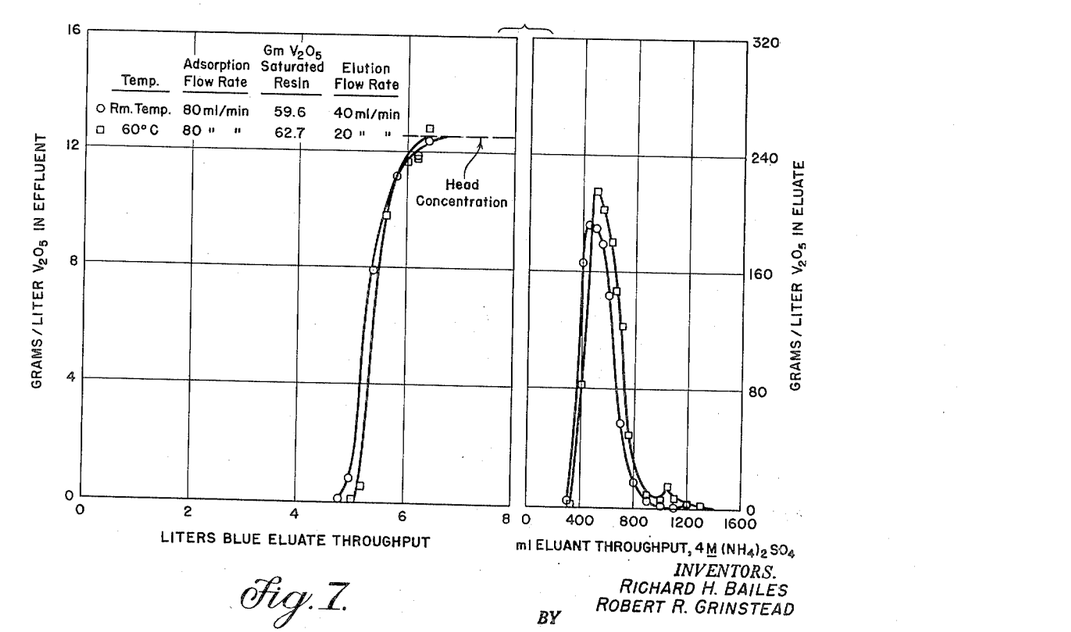
Fig. 7 is a graphical representation of results obtained with adsorption of vanadium on a 68" column followed by elution with $(NH_4)_2SO_4$ solution.

Two 68″ x 1″ columns of Dowex 50 in the hydrogen form were saturated with V from a blue anionic exchange eluate containing $V_2O_5$ equivalent to 12.5 g./liter, $PO_4^=$ equivalent to 35 g./liter, Fe=0.42 g./liter and Na=0.05 g./liter. The columns were thoroughly washed with water and eluted with 4 M $(NH_4)_2SO_4$ solution, one at room temperature and the other at 60° C. Adsorption and elution results were obtained as illustrated in Fig. 7 of the drawing.

As may be noted, the vanadium concentration in the eluate is increased to a value of the order of 215 g./liter as compared with the much lower values obtained with the 34″ column runs of Example VII.

EXAMPLE IX

It was noticed, on consideration of the eluate analyses obtained with columns of varying length, that the amount of phosphate which appeared in the eluate from a well-washed column increases little, if any, as the column length is increased. In other words, the quantity of phosphate remaining in the columns is a substantially constant value regardless of length so that the degree of contamination may be determined by the resin column length limited almost exclusively by the practical lengths of columns which may be employed.

Standard practice had been to wash the column until a $PO_4^=$ concentration was less than 0.01 g./liter in the effluent, at which point, phosphate was being removed very slowly. Subsequent 6 N HCl eluates contained a small phosphate peak, the apex concentration of which varied from about 0.05 to 0.15 g./liter. Within the limits of accuracy of the analytical method this value was substantially constant for different column lengths. However, a six to eight fold increase in V concentration is realized in going from a 2" to a 68" column length so that phosphorous contamination based on vanadium content of only hundredths of a percent are obtainable.

Figure 8:
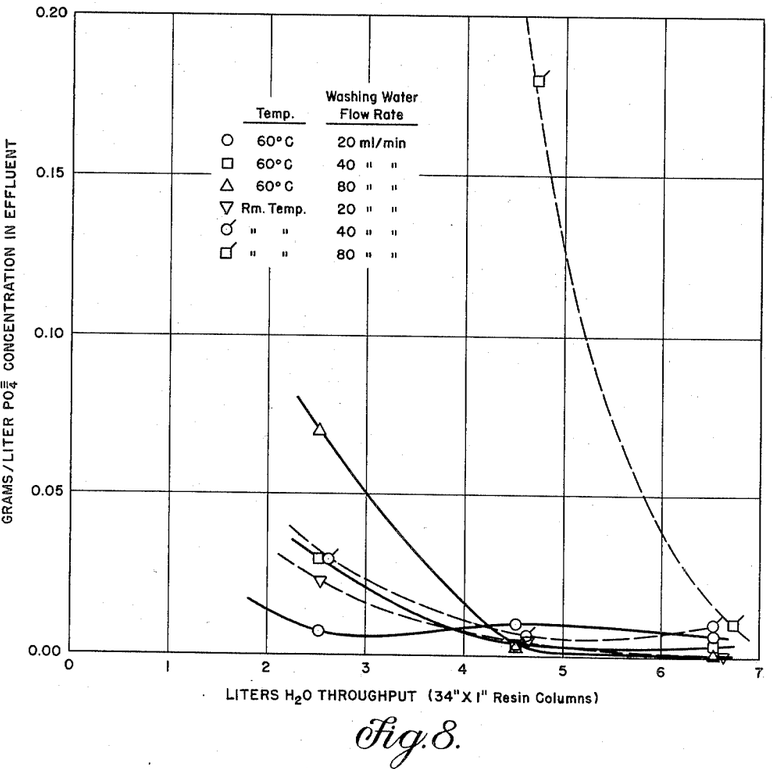
Fig. 8 is a graphical representation of phosphate removal results obtained by washing a 34" x 1" column with different flow rates and at different temperatures.
Figure 9:
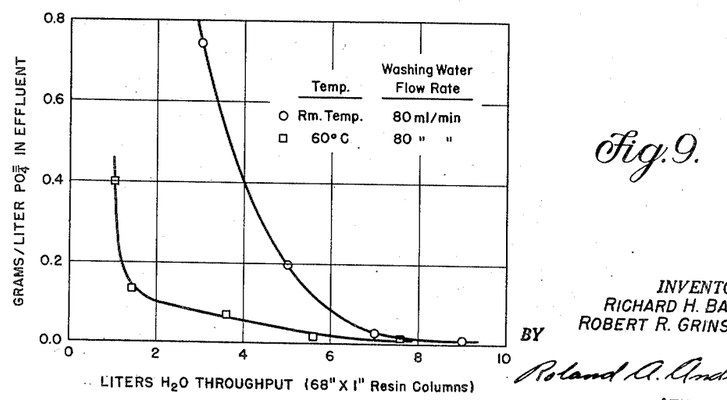
Fig. 9 is a graphical representation of phosphate removal by water washing a 68" x 1" column at different temperatures.

Accordingly, certain washing variables using 34" and 68" length columns were investigated with the conditions and results indicated in Figs. 8 and 9 of the drawing. Dowex 50 columns were saturated with $VO^{++}$ from actual anionic exchange process eluates and the washing operation conducted under conditions indicated in the said Figs. 8 and 9.

The following conclusions may be drawn from the foregoing based on obtaining a phosphate concentration less than about 0.01 g./liter: Doubling the column length requires only a 50% increase in the amount of washing water for equivalent phosphate removal. Increasing the flow rate increases the amount of water required but less total time is needed. Phosphate removal at higher temperatures is more rapid and heating the wash water to 60° C. produces an effect similar to halving the flow rate.

EXAMPLE X

Two sets of experiments were performed relating to precipitation of vanadium from $(NH_4)_2SO_4$ eluates. Hot precipitations were performed with the conditions and results appearing in Table A and cold precipitations as noted in Table B, which follow:

Table A.—Recovery of vanadium from 4 M $(NH_4)_2SO_4$ Eluates

PRECIPITATION FROM A HOT SOLUTION

Head solution was an eluate obtained from Dowex 50 column previously saturated with actual blue eluate. Solution contained 59.8 grams $V_2O_5$/liter (as $VO^{++}$)

0.14 gram $PO_4^{\equiv}$/liter
2.4 grams Fe/liter 200 ml. portions of solution were heated to about 60° C., and 15 N $NH_3$ added to obtain specified pH. Slurries were digested on a steam bath 1 hour, filtered, and washed twice with $H_2O$. Three precipitates were fused 1½ hours at 800° C.

| Experiment No. (60750GV) | 1 | 2 | 3 | 4 | 5 | 6 |
|---|---|---|---|---|---|---|
| Pptn. temp. (° C.) | 58 | 67 | 70 | 66 | 62 | 61 |
| Pptn. pH | 3.7 | 4.3 | 4.8 | 5.6 | 6.2 | 7.0 |
| ml. 15 N $NH_3$ used | 18 | 26 | 27.3 | 26.9 | 28.2 | 29.8 |
| Filtrate analysis $V_2O_5$ g/liter | 15.6 | 4.0 | 0.83 | 0.24 | 0.42 | 0.36 |
| Percent pptn | 74.6 | 93.3 | 98.5 | 99.6 | 99.3 | 99.4 |

ANALYSIS OF PPTS. (DRIED AT 110° C.)[1]

| | | | | | | |
|---|---|---|---|---|---|---|
| Percent $V_2O_5$ | | | 58.3 | 59.7 | | 56.6 |
| Percent $NH_4$ | | | 12.0 | 10.0 | | 11.5 |
| Percent $SO_4^{\equiv}$ | | | 26.3 | 23.8 | | 25.3 |
| Percent P | | | <0.01 | <0.01 | | <0.01 |
| Total | | | 96.6 | 93.5 | | 93.4 |

ANALYSIS OF PPTS. (FUSED AT 800° C.)

| | | | | | | |
|---|---|---|---|---|---|---|
| Percent $V_2O_5$ | | | 92.9 | 94.1 | | 90.9 |
| Percent $Fe_2O_3$ | | | 2.2 | 1.8 | | 3.6 |
| Percent P | | | <0.01 | <0.01 | | 0.04 |
| Percent S | | | 0.02 | 0.03 | | 0.08 |
| Total | | | 95.1 | 95.9 | | 93.7 |

[1] No. 3 ppt. not washed.

Table B.—Recovery of vanadium from 4 M $(NH_4)_2SO_4$ Eluates

PRECIPITATION FROM A COLD SOLUTION

Head solution was an eluate obtained from Dowex 50 column previously saturated with actual blue eluate. Solution contained 70.3 grams $V_2O_5$/liter (as $VO^{++}$), 0.02 gram $PO_4^{\equiv}$/liter and 2.60 grams Fe/liter.

100 ml. portions of solution were neutralized to specified pH, allowed to stand 4 to 5 hours, filtered, and precipitates were fused at 800° C.

| Experiment No. (51750GV) | 1 | 2 | 3 | 4 | 5 | 6 |
|---|---|---|---|---|---|---|
| Pptn. temp. (° C.) | 28 | 30 | 33 | 33 | 30 | 33 |
| Pptn. pH | 3.5 | 4.2 | 6.0 | 4.9 | 5.5 | 7.0 |
| ml. 15 N $NH_3$ used | 7 | 14 | 16 | 15 | 16 | 15 |
| Filtrate analysis (gms. $V_2O_5$/liter) | 40.3 | 3.27 | 0.02 | 0.39 | 0.05 | 0.09 |
| Percent pptn | 50.0 | 95.8 | >99.9 | 99.5 | >99.9 | 99.9 |

ANALYSIS OF PPTS. (FUSED AT 800° C.)

| | | | | | | |
|---|---|---|---|---|---|---|
| Percent $V_2O_4$ | | 93.0 | 94.0 | 94.3 | 92.0 | 94.0 |
| Percent $Fe_2O_3$ | | 1.9 | 2.0 | 1.1 | 2.3 | 3.2 |
| Percent P | | 0.02 | <0.01 | <0.01 | <0.01 | <0.01 |
| Percent S | | 0.054 | 0.016 | 0.036 | 0.059 | 0.035 |
| Total | | 95.0 | 96.0 | 95.4 | 94.4 | 97.2 |

Recoveries are slightly higher when the precipitation is carried out in the cold; however, the hot precipitates are much easier to filter. The filtrates from these precipitations may be recycled as elutriants following addition of makeup $(NH_4)_2SO_4$.

EXAMPLE XI

Vanadium from an actual blue anionic exchange eluate was adsorbed on a Dowex 50 cationic exchange resin, the adsorbate washed with water and eluted with 6 M HCl. An eluate having the following composition was obtained by the above treatment:

79.7 g. $V_2O_5$/liter 0.79 g. $PO_4^{\equiv}$/liter
2.65 g. Fe/liter
About 4 M HCl To one liter of the above solution was added 80 mg. of Zr as $ZrOCl_2$, corresponding to a 200% stoichiometric quantity, while at a temperature of 80° C. Then 350 ml. of 15 N $NH_4OH$ was added to the solution to adjust the pH to 1.1, the mixture was digested for 3–4 hours and the zirconyl phosphate filtered therefrom. 0.016 g./liter of $PO_4^{\equiv}$ remained in the filtrate, corresponding to 0.03% of the vanadium content. Only 0.2% of the vanadium was found in the zirconyl precipitate.

Then 185 ml. of 15 N $NH_4OH$ was added to the filtrate at the same temperature to raise the pH to 6.2 whereupon 99.9% of the vanadium precipitated as a tetravalent hydrous oxide. The filtered product was dried at 110° C. and then ignited for 12 hours at 400° C., whereupon the product assayed as follows:

|  | Percent |
|---|---|
| $V_2O_5$ | 95.9 |
| P | 0.006 |
| $Fe_2O_3$ | 3.8 |

EXAMPLE XII 100 ml. samples of an actual cationic exchange eluate containing 64.7 g. $V_2O_5$/liter, 0.05 g. $PO_4^{\equiv}$/liter, 3.4 g. Fe/liter and about 4–5 M HCl were partially neutralized with 15 N $NH_3$ and heated to 60° C. Then 6 M $NaClO_3$ solution was added dropwise until the yellow color of pentavalent vanadium persisted and the solutions were cooled. After cooling, the pH of the solutions were readjusted with 15 N $NH_4OH$, the solutions digested on a steam bath for 1 hour and the pentavalent hydrous oxide precipitate formed by such treatment was filtered therefrom. The precipitates were then dried 10-15 hours at 110° C.

The results and specific conditions for the foregoing experiments are noted in Table A which follows:

*Table A*

| Expt. No. | pH at addition of NaClO₃ | Amt. NaClO₃ soln. added, ml. | Percent stoich. amt. of NaClO₃ [1] | Final adjusted pH | Filter pH | Filtr. anal., V₂O₅ g./l. | Percent pptn. of V₂O₅ |
|---|---|---|---|---|---|---|---|
| 051250H1 | 4-5 M HCl | 8.5 | 400 | 1.0 | 1.0 | 1.2 | 97.9 |
| 051250H2 | 1.0 | 4.3 | 200 | 2.0 | 1.5 | 0.96 | 98.9 |
| 051250H4 | 2.0 | 3.8 | 180 | 3.1 | 2.6 | 1.96 | 97.6 |
| 051250H9 | 5.2 | 3.0 | 140 | 7.0 | 6.5 | 0.14 | 99.7 |
| 051250H6 | 5.6 | 3.0 | 140 | 5.4 | 3.0 | 1.77 | 97.4 |
| 051250H7 | 5.6 | 4.0 | 190 | 5.4 | 3.5 | 0.7 | 98.6 |
| 051250H8 | 6.8 | [2] 4.0 | 190 | 1.2 | 2.0 | 9.95 | 82.4 |

[1] Based on oxidation of vanadium present from +4 to +5 state, and reduction of ClO₃⁻ to Cl⁻.
[2] No oxidation after 2 hours.

Analyses of the products obtained in experiments 051250H4 and 051250H9 noted above are shown in Table B which follows:

*Table B.—Composition of vanadium cakes obtained by oxidation and neutralization of 6 M HCl eluates*

| | | Percent V₂O₅ | Percent Fe₂O₃ | Percent Na₂O | Percent P | Total |
|---|---|---|---|---|---|---|
| Dried 12 hours at 110° C | 051250H4 | 63.1 | 5.4 | 1.2 | 0.006 | 69.7 |
| | 051250H9 | 58.3 | 5.1 | 1.7 | 0.007 | 65.1 |
| Ignited 20 hours at 400° C | 051250H4 | 88.5 | [1] 7.6 | [1] 1.7 | 0.037 | 97.8 |
| | 051250H9 | 95.9 | [1] 8.4 | [1] 2.8 | 0.016 | 107.1 |

[1] Calculated from analysis of ppt. dried at 110° C., assuming no loss of V₂O₅, Fe₂O₃, or Na₂O on ignition.

EXAMPLE XIII

An eluate was obtained by eluting a vanadium saturated Dowex-50 cationic exchange column with 5.4 N NaCl which contained 43 g. V₂O₅/liter, 2.45 g. Fe/liter, 0.07 g. PO₄≡/liter, and which had a pH of −0.3. 200 ml. samples of this eluate were treated with ZrOCl₂ either with or without the addition of 15% NaOH solution and the zirconyl phosphate precipitate produced thereby was filtered from the solution under the conditions and with the results tabulated in Table A, which follows:

*Table A*

| Expt. No. | Amt. Added Zr, mg. | Percent Stoich. Zr added | Temp. at which pH adjusted, °C. | Adjusted pH | Amt. 15% NaOH added, ml. | Filtrate Analysis PO₄≡, g./l. | ratio, P/V₂O₅, percent |
|---|---|---|---|---|---|---|---|
| 051250GV1 | 8.8 | 125 | 25 | −0.3 | 0 | | 0.05 |
| 051250GV2 | 8.8 | 125 | 25 | 1.0 | 8 | 0.02 | 0.01 |
| 051250GV3 | 14 | 200 | 25 | −0.3 | 0 | | 0.05 |
| 051250GV4 | 14 | 200 | 25 | 1.0 | 8 | 0.015 | 0.01 |
| 051250GV5 | 8.8 | 125 | 80 | −0.3 | 0 | 0.01 | 0.01 |
| 051250GV6 | 8.8 | 125 | 75 | 1.0 | 8 | 0.01 | 0.01 |
| 051250GV7 | 14 | 200 | 80 | −0.3 | 0 | 0.007 | 0.01 |
| 051250GV8 | 14 | 200 | 62 | 1.0 | 8 | 0.01 | 0.01 |

No ppt. appeared in Nos. 1 through 4 after 3 hours; 1 and 3 not filtered; 2 and 4 neutralized to pH 1.8, stood 1 hour more, filtered.
Nos. 5 through 8 digested on steam bath 1 hour, cooled for 2 hours, filtered.

The filtrates from the above were then neutralized further with 15% NaOH solution to precipitate a hydrous tetravalent vanadium oxide therefrom, the slurries were allowed to stand for 1 hour and the precipitates filtered therefrom. Then the precipitates were dried for 2 days at 110° C. and heated to 400° C. for 16 hours with conditions and results noted in Table B which follows:

*Table B.—Precipitation of vanadium from 5.4 N NaCl eluates*

| Expt. No. | Adjusted pH for pptn. | Temp. at which pH adjusted, °C. | Amt. 15% NaOH needed, ml. | Filtrate anal., V₂O₅ g./l. | Percent pptn. | Percent V₂O₅ | Percent Fe₂O₃ | Percent P | Percent Na₂O | Percent Total |
|---|---|---|---|---|---|---|---|---|---|---|
| 051250GV1 | 3.0 | 35 | 10 | 1.73 | 95.8 | 68.1 | 0.9 | 0.01 | 24.5 | 93.5 |
| 051250GV2 | 5.4 | 35 | 11 | 0.13 | 99.7 | 69.6 | 0.7 | 0.003 | 22.2 | 92.5 |
| 051250GV3 | 4.2 | 40 | 16 | 0.42 | 98.9 | 52.0 | 2.5 | 0.02 | 51.1 | 105.6 |
| 051250GV4 | 7.0 | 35 | 14 | 0.12 | 99.7 | 61.0 | 3.3 | 0.007 | 47 | 111 |
| 051250GV5 | 3.5 | 80 | 12 | 1.63 | 94.9 | 84.8 | 1.1 | 0.0008 | 16.5 | 102.4 |
| 051250GV6 | 4.1 | 70 | 12 | 1.01 | 98.1 | 82.0 | 1.3 | 0.01 | 17.4 | 100.8 |
| 051250GV7 | 5.5 | 64 | 15 | 0.14 | 99.7 | 67.5 | 4.3 | 0.01 | 24.6 | 96.4 |
| 051250GV8 | 7.0 | 66 | 13 | 0.24 | 99.4 | 47 | 6.3 | 0.008 | 14.5 | 68 |

While there has been described in the foregoing what may be considered to be preferred embodiments of the invention, modifications may be made therein without departing from the spirit of the invention and it is intended to cover all such as come within the scope of the appended claims.

What is claimed is:

1. In a process for purifying and recovering vanadium values from a solution containing tetravalent vanadium cations and an inorganic phosphatic impurity, the steps comprising adsorbing the tetravalent vanadium on a cationic exchange resin, whereby a portion of the phosphatic impurity is also adsorbed thereon, washing the resin with water thereby removing a portion of the phosphatic impurity from the resin, eluting the vanadium from the resin with an aqueous elutriant means, and recovering the vanadium from the eluate.

2. The process as defined in claim 3 wherein the water employed to wash said phosphatic impurities from the column is heated to about 70° C.

3. In a process for purifying and recovering vanadium from a solution containing tetravalent cationic vanadium values and inorganic phosphatic impurities, the steps comprising contacting said solution with a column of cationic exchange resin in the hydrogen form, whereby the vanadium cations and a portion of the phosphatic impurities are adsorbed thereon, washing the column with water to remove phosphatic impurities from the column, eluting the vanadium from the column with an aqueous elutriant means, oxidizing the vanadium in the effluent elutriant to the pentavalent oxidation state, adjusting the pH of the solution to above about pH 1.3 in order to precipitate the vanadium as a pentavalent hydrous oxide from the solution, and separating the precipitate from the solution.

4. In a process for purifying and recovering vanadium from a solution containing tetravalent cationic vanadium values and inorganic phosphatic impurities, the steps comprising contacting said solution with a column of cationic exchange resin in the hydrogen form, whereby the vanadium values and a portion of the phosphatic impurities are adsorbed thereon, washing the column with water to remove phosphatic impurities therefrom, eluting vanadium from said column with an aqueous chloride solution, precipitating phosphatic impurity from the solution by adjusting the acidity thereof to between about 1 M H$^+$ and pH 2.5 and with the addition of a salt of a material selected from the group consisting of zirconium and titanium, separating the precipitate from the solution, whereby a purified vanadium solution is produced, and recovering the purified vanadium from the solution.

5. In a process for purifying and recovering vanadium values from a solution containing tetravalent cationic vanadium values and inorganic phosphatic impurities, the steps comprising contacting said solution with a column of cationic exchange resin in the hydrogen form, whereby the vanadium values and a portion of the phosphatic impurities are adsorbed thereon, washing the column with water to remove phosphatic impurities therefrom, eluting vanadium from said column with an aqueous solution containing a material selected from the group consisting of NaCl and HCl, precipitating phosphatic impurity from the solution by adjusting the acidity of the solution to a value between about 1 M H$^+$ and pH 2.5 and with the addition of an oxychloride salt of a material selected from the group consisting of Zr and Ti, separating the precipitate from the solution, whereby a purified vanadium solution is produced, oxidizing the vanadium to the pentavalent state in the solution, adjusting the pH of the solution to a value of above about 1.3 whereby the vanadium precipitates as a pentavalent hydrous oxide from the solution, and separating the precipitate from the solution.

6. The process as defined in claim 5 wherein said water which is employed to wash phosphatic impurities from the column is heated to about 70° C.

7. In a process for purifying and recovering vanadium values from a solution containing tetravalent cationic vanadium values and inorganic phosphatic impurities, the steps comprising contacting said solution with a column of cationic exchange resin in the hydrogen form, whereby the vanadium values and a portion of the phosphatic impurities are adsorbed thereon, washing the column with water to remove phosphatic impurities therefrom, eluting vanadium from said column with an aqueous solution containing a material selected from the group consisting of NaCl and HCl, precipitating phosphatic impurity from the solution by adjusting the acidity thereof to a value between about 1 M H$^+$ and pH 2.5 and with the addition of an oxychloride salt of a material selected from the group consisting of Zr and Ti, separating the precipitate from the solution, whereby a purified vanadium solution is produced, adjusting the pH of the solution to a value in the range of about 2.5 to 5, whereby a purified tetravalent hydrous vanadium oxide is precipitated from the solution, separating the precipitate from the solution, and calcining the precipitate to produce a purified vanadium pentoxide therefrom.

8. In a process for recovering vanadium values from an eluate solution containing vanadyl values and inorganic phosphate impurities, the steps comprising contacting the solution with a long column of cationic exchange resin in the hydrogen form, whereby the vanadium and a portion of the phosphate are adsorbed thereon, washing the column with water to remove phosphate impurities, eluting vanadium from the column with a solution of a material selected from the group consisting of HCl, NaCl and (NH$_4$)$_2$SO$_4$, whereby there is obtained an effluent containing more than about 100 g./liter of vanadium and minor amounts of impurities, oxidizing the vanadium to the pentavalent state in the solution, adjusting the pH of the oxidized solution to a value above about 1.3, whereby a hydrous pentavalent vanadium oxide precipitates therefrom, separating the precipitate from the solution, and drying the material to yield a purified vanadium pentoxide product.

9. In a process for recovering vanadium values from an eluate solution containing vanadyl values and inorganic phosphate impurities, the steps comprising contacting the solution with a long column of cationic exchange resin in the hydrogen form, whereby the vanadium and a portion of the phosphate are adsorbed thereon, washing the column with water to remove phosphate impurities, eluting vanadium from the column with a solution of a material selected from the group consisting of HCl, NaCl and (NH$_4$)$_2$SO$_4$, whereby there is obtained an effluent containing more than about 100 g./liter of vanadium and minor amounts of impurities, precipitating a hydrous tetravalent vanadium oxide from the solution by adjusting the pH thereof to a value in the range of about 2.6 to 5, separating the precipitate from the solution, and calcining the precipitate to yield a purified vanadium pentoxide product.

10. In a process for producing a low phosphate vanadium oxide product from a cationic eluate, the step comprising precipitating residual phosphate from the solution by adjusting the acidity of the solution to a value between about 1 M H$^+$ and pH 2.5 and with the addition of a material selected from the group consisting of TiO$^{++}$ and ZrO$^{++}$ ions.

11. In a process for purifying and recovering vanadium values from an eluate solution containing vanadyl ions and inorganic phosphate impurity, the steps comprising contacting said solution with a column of cationic exchange resin in the hydrogen form, whereby vanadyl ions and phosphate are adsorbed thereon, washing the column with water to remove phosphate impurities therefrom, eluting the vanadium from the solution with a hydrochloric acid solution of constant boiling composition, precipitating phosphate impurity from the solution by adjusting the acidity of the solution to a value in the range of between about 1 M H$^+$ and pH 2.5 and with the addition of a material selected from the group consisting of ZrO$^{++}$ and TiO$^{++}$ ions, filtering the precipitate from the solution, oxidizing the vanadium in the filtrate to the pentavalent state, precipitating hydrous pentavalent vanadium oxide from the filtrate by adjusting the pH thereof to a value above about 1.3, and recovering and drying the pentavalent vanadium oxide precipitate.

12. The process as defined in claim 11 wherein the filtrate is concentrated subsequent to filtration of the phosphate precipitate from the said solution and prior to said step of oxidizing the filtrate to precipitate the hydrous pentavalent vanadium oxide therefrom.

13. In a process for purifying and recovering vanadium values from an eluate solution containing vanadyl ions and inorganic phosphate impurity, the steps comprising contacting said solution with a column of cationic exchange resin in the hydrogen form, whereby vanadyl ions and phosphate are adsorbed thereon, washing the column with water to remove phosphate impurities therefrom, eluting the vanadium from the column with a hydrochloric acid solution of constant boiling composition, precipitating phosphate impurity from the solution by adjusting the acidity of the solution to a value in the range of between about 1 M H+ and pH 2.5 and with the addition of a material selected from the group consisting of $ZrO^{++}$ and $TiO^{++}$ ions, filtering the precipitate from the solution, precipitating a hydrous tetravalent vanadium oxide from the filtrate by adjusting the acidity of the solution to a pH value in the range of about 2.6 to 5, separating the precipitate from the solution, and calcining the precipitate to produce a phosphate free vanadium pentoxide product.

14. The process as defined in claim 13 wherein the filtrate is concentrated by distillation subsequent to filtration of the phosphate precipitate from the said solution and prior to said step of precipitating a hydrous tetravalent vanadium oxide from the filtrate.

15. In a process for recovering and purifying pentavalent vanadium values from an acidic solution containing quantitites of an inorganic phosphatic impurity, the steps comprising reducing the pentavalent vanadium values to the cationic tetravalent state in the solution, contacting said solution with a column of cationic exchange resin in the hydrogen form, whereby the vanadium cations and a portion of the phosphatic impurities are adsorbed thereon, washing the column with water to remove phosphatic impurities from the column, eluting the vanadium from the column with an aqueous elutriant solution, oxidizing the vanadium in the effluent elutriant to the pentavalent oxidation state, adjusting the pH of the solution to about pH 1.3 to precipitate the vanadium as a purified pentavalent hydrous oxide from the solution, and separating the precipitate from the solution.

16. In a process for recovering and purifying pentavalent vanadium values from an acidic solution containing inorganic phosphatic impurities, the steps comprising treating the solution with sulfur dioxide gas to reduce the pentavalent vanadium values to a tetravalent cationic state, contacting said solution with a column of cationic exchange resin in the hydrogen form, whereby the vanadium values and a portion of the phosphatic impurities are adsorbed thereon, washing the column with water to remove phosphatic impurities therefrom, eluting vanadium from said column with an aqueous chloride solution, precipitating phosphate impurity from the solution by adjusting the acidity thereof to between about 1 M H+ and pH 2.5 and with the addition of a salt of a material selected from the group consisting of zirconium and titanium, separating the precipitate from the solution, whereby a purified vanadium solution is produced, and recovering the purified vanadium values from the solution.

References Cited in the file of this patent

UNITED STATES PATENTS 1,437,191  Paul _________________ Nov. 28, 1922

OTHER REFERENCES

Myers, Industrial and Engineering Chemistry, volume 35, pp. 858–863 (1943).

Mindler et al.: Industrial and Engineering Chemistry, vol. 43, pp. 1079–1081 (May 1951).